(12) United States Patent
Hansmann et al.

(10) Patent No.: US 9,996,511 B2
(45) Date of Patent: Jun. 12, 2018

(54) FREE FORM WEBSITE STRUCTURE DESIGN

(71) Applicant: INTERNATIONAL BUSINESS MACHINES CORPORATION, Armonk, NY (US)

(72) Inventors: Uwe Hansmann, Boeblingen (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/078,192

(22) Filed: Mar. 23, 2016

(65) Prior Publication Data

US 2017/0277665 A1  Sep. 28, 2017

(51) Int. Cl.
*G06F 17/30* (2006.01)
*G06F 17/22* (2006.01)

(52) U.S. Cl.
CPC .... *G06F 17/2247* (2013.01); *G06F 17/30873* (2013.01); *G06F 17/30896* (2013.01)

(58) Field of Classification Search
CPC .................................................. G06F 17/3089
See application file for complete search history.

(56) References Cited

U.S. PATENT DOCUMENTS

| 7,168,038 | B2 * | 1/2007 | Lui | G06F 17/211 382/173 |
|---|---|---|---|---|
| 7,973,957 | B2 * | 7/2011 | Dodge | G06F 3/038 178/18.03 |
| 8,245,145 | B1 * | 8/2012 | Eakin | G06F 17/3089 715/760 |
| 2004/0225958 | A1 * | 11/2004 | Halpert | G06F 17/3089 709/246 |
| 2005/0281437 | A1 * | 12/2005 | Fruchter | G06F 3/03545 382/113 |
| 2006/0007189 | A1 * | 1/2006 | Gaines, III | G06F 17/243 345/179 |
| 2009/0210440 | A1 * | 8/2009 | Fredrickson | G06Q 10/06 |
| 2012/0250048 | A1 * | 10/2012 | Takaragi | G06K 15/02 358/1.9 |
| 2014/0132623 | A1 * | 5/2014 | Holten | G06T 11/206 345/593 |

(Continued)

OTHER PUBLICATIONS

Jamey Ekins—Turn Your Sketches & Doodles Into Vector Art—Tutorial available Jun. 5, 2013, pp. 1-6 http://dabblesandbabbles.com/turn-your-sketches-doodles-into-vector-art-tutorial/.*

(Continued)

*Primary Examiner* — Scott Baderman
*Assistant Examiner* — Mario M Velez-Lopez
(74) *Attorney, Agent, or Firm* — Heslin Rothenberg Farley & Mesiti P.C.

(57) ABSTRACT

Website structure creation. A site navigation structure sketch is created by a free-form drawing using a drawing tool being executed on a computing device. The site navigation structure sketch is stored in pixel form, and processed by transforming the site navigation structure sketch by vectorizing the sketch into a predefined structured representation. A site navigation structure is created based on the predefined structured representation, and the site navigation structure is integrated into a web portal site structure.

20 Claims, 6 Drawing Sheets

(56) References Cited

U.S. PATENT DOCUMENTS

2014/0281914 A1* 9/2014 Sakawaki ......... G06F 17/30896
715/234

OTHER PUBLICATIONS

Brianna Wu: Vector illustrations are more than just fun on the iPad Pro: Jan. 6, 2016, pp. 1-5 http://www.imore.com/vector-illustrations-are-more-just-fun-ipad-pro (hereinafter: Brianna).*
Guide to making good website—structure, Apr. 2015, pp. 1-3 https://web.archive.org/web/20150418213059/https://www2.warwick.ac.uk/services/its/servicessupport/web/sitebuilder2/goodsites/structure/.*
Turnbull, Connor, "Build a Complete Website on an iPad," Jun. 2012, pp. 1-15.

* cited by examiner

```
<svg height="400" width="500">
<line x1="40" y1="0" x2="40" y2="250" style="stroke:rgb(0,0,0);stroke-width:2" />
<text x="40" y="15" fill="black">home</text>
<line x1="40" y1="0" x2="300" y2="0" style="stroke:rgb(0,0,0);stroke-width:2" />
<text x="90" y="100" fill="black">news</text>
<line x1="60" y1="90" x2="400" y2="100" style="stroke:rgb(0,0,0);stroke-width:2" />
<text x="50" y="150" fill="black">banking</text>
<line x1="40" y1="130" x2="150" y2="120" style="stroke:rgb(0,0,0);stroke-width:2" />
<text x="70" y="180" fill="black">support</text>
<line x1="40" y1="200" x2="250" y2="210" style="stroke:rgb(0,0,0);stroke-width:2" />
<text x="150" y="200" fill="black">call us</text>
<line x1="80" y1="200" x2="80" y2="260" style="stroke:rgb(0,0,0);stroke-width:2" />
<text x="200" y="240" fill="black">send us an email</text>
<line x1="80" y1="260" x2="250" y2="260" style="stroke:rgb(0,0,0);stroke-width:2" />
</svg>
```

```
<content-node action="update" active="true" allportletsallowed="true"
content-parentref="Z6_000000000000000A0BR2B300GO2" create-type="explicit"
domain="rel" objectid="Z6_19AG0I41L8NI60AUVFC5OL3002" ordinal="196608"
themeref="undefined" type="staticpage" uniquename="ibm.portal.home.news">
    <localedata locale="en">
        <title>news</title>
    </localedata>
</content-node>
```

FIG. 4

FREE FORM WEBSITE STRUCTURE DESIGN

BACKGROUND

One or more aspects of the invention relate generally to creating a website structure, and more specifically, to website structure creation using a free form tool.

The Word Wide Web has been an amazing success in making information available around the world on many different devices with many different form factors. In the beginning, special knowledge, like programming competencies in Hypertext Markup Language (HTML) programming, was required in order to make simple web-pages available on a web server. Today, there are toolsets available so that programming novices can also create web-pages. However, in order to design and structure more complex content, a website requires a structure and hierarchy of web-pages. An accompanying useful navigation between different web-pages of a website may also be required so that users are not lost between different web-pages. However, the more the World Wide Web underpins worldwide information exchange and the more large amounts of business transactions—buying and selling—are performed online, the more non-programmers are exposed to the requirement not only to design web-pages, but also more complex structures of websites. However, they are not trained to work with computer based design tools; they are used to working on paper or flip charts and white boards.

New agile design methods to facilitate collaboration between IT (Information Technology) specialists and business oriented people in project teams to design web-pages and underlying website structures at an ever increasing speed—the design thinking method may be named here as an example—often rely on design work, i.e., designing a website structure with pen and paper. Translating such a logical design of a navigation tree of a website into an electronic form requires competencies and time. The multidisciplinary teams would be relieved if a website structure could be translated in an automatic fashion starting from a pen and paper exercise.

SUMMARY

Shortcomings of the prior art are overcome and additional advantages are provided through the provision of a computer-implemented method of website structure creation. The method includes storing, by a processing device, a site navigation structure sketch in pixel form, the site navigation structure sketch created by a free-form drawing using a drawing tool being executed on a computing device; processing the site navigation structure sketch by transforming said site navigation structure sketch by vectorizing the sketch into a predefined representation; creating a site navigation structure based on the predefined representation; and integrating the site navigation structure into a web portal site structure.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

It should be noted that embodiments of the invention are described with reference to different subject-matters. For example, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, e.g., between features of the method type claims and features of the apparatus type claims, is considered as to be disclosed within this document.

The aspects defined above and further aspects of the present invention are apparent from the examples of embodiments to be described hereinafter and are explained with reference to the examples of embodiments, but to which aspects of the invention are not limited.

Figure 1:
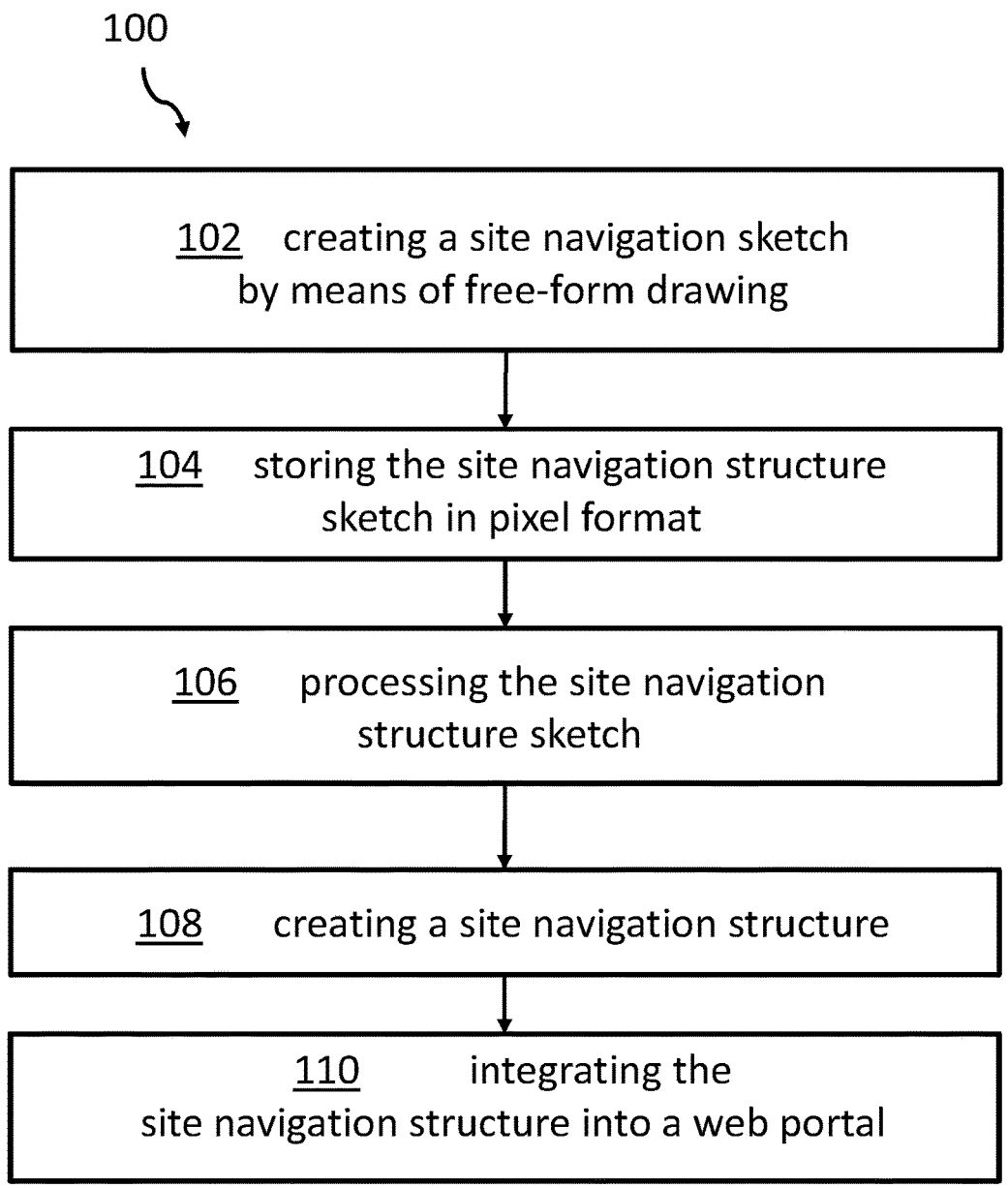
Figure 2:
Figure 5:
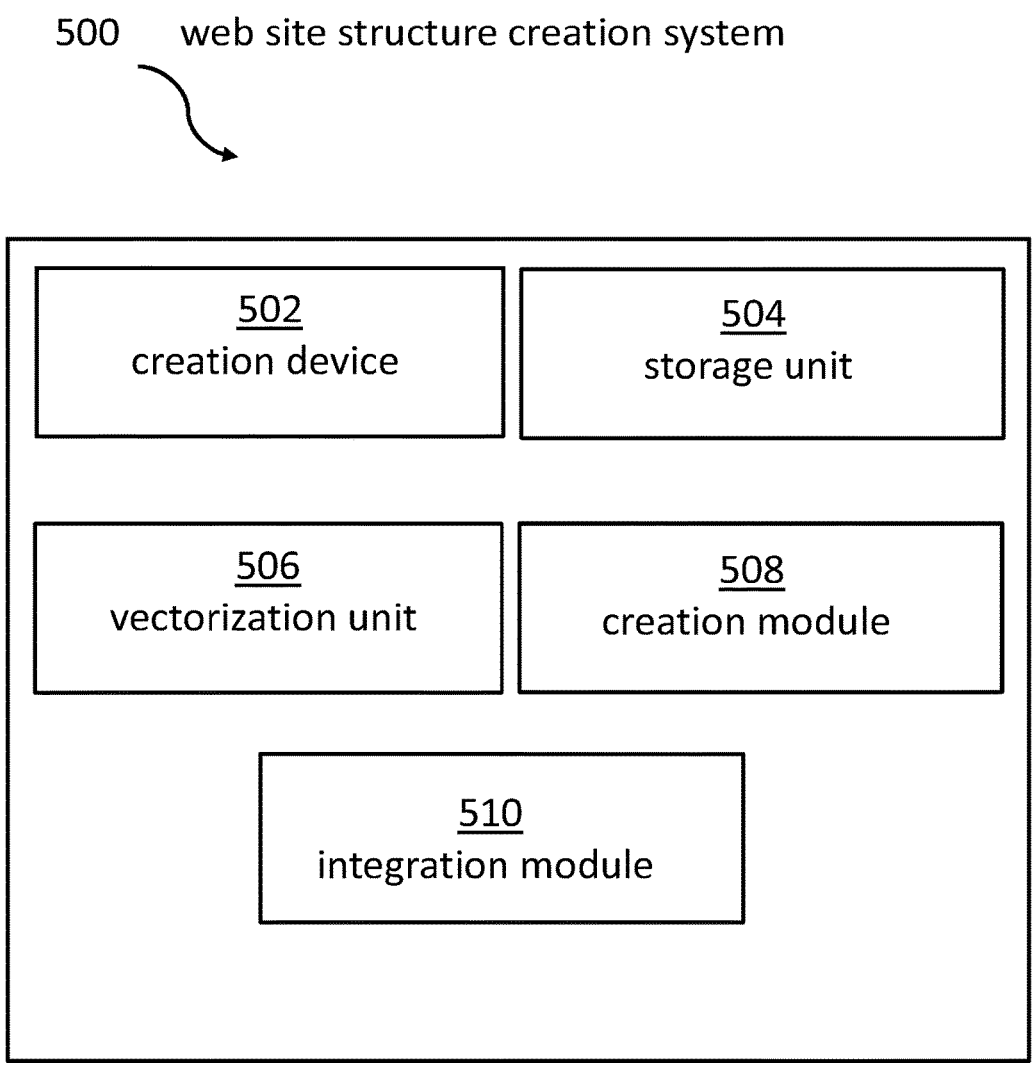
Figure 6:
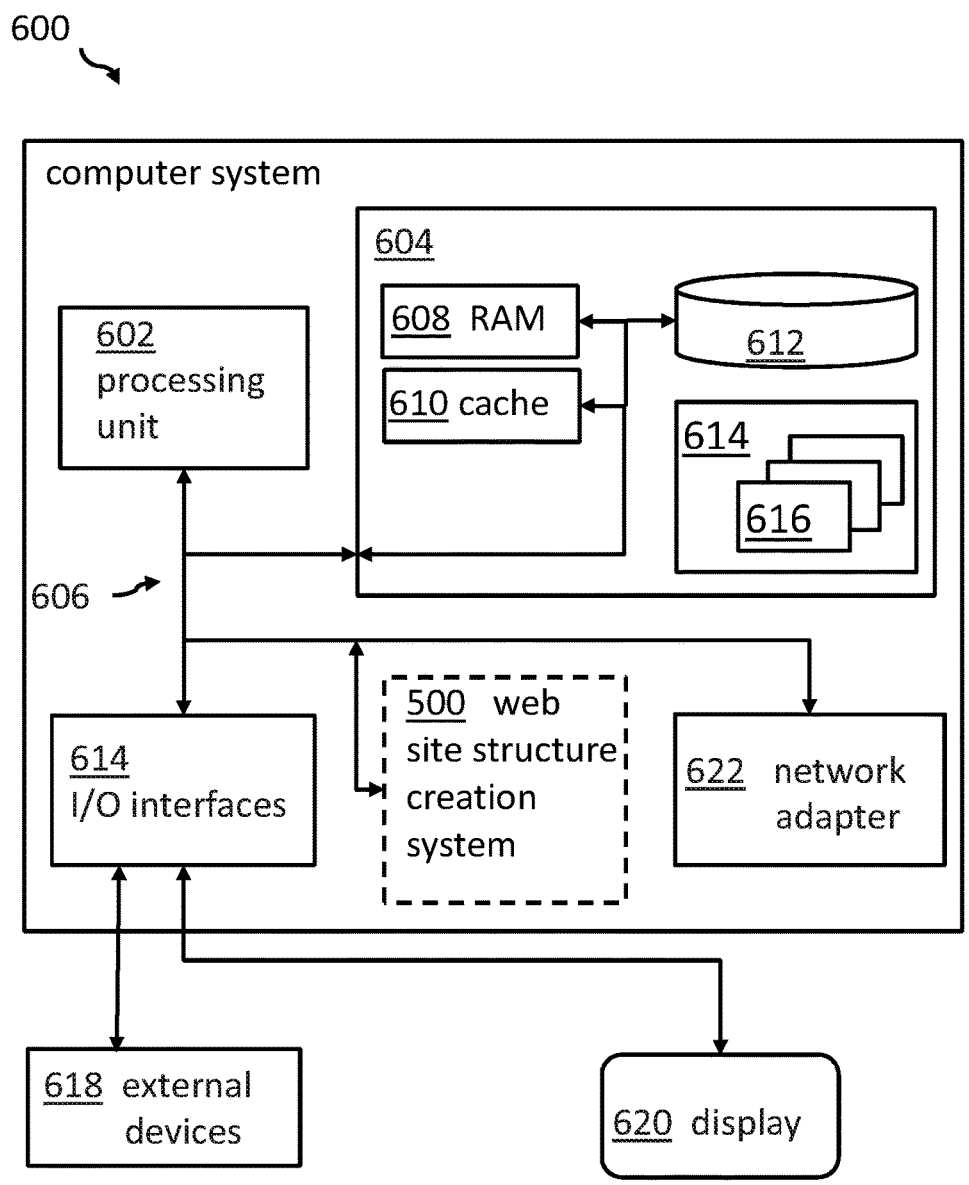

Embodiments of the invention will be described, by way of example only, and with reference to the following drawings:

FIG. 1 shows a block diagram of an embodiment of an easy website structure creation, in accordance with an aspect of the present invention;

FIG. 2 shows an example site navigation structure sketch, in accordance with an aspect of the present invention;

FIG. 3 shows an example of a transformation of the site navigation structure sketch into an svg file, in accordance with an aspect of the present invention;

FIG. 4 shows an Extensible Markup Language (XML) example of a simplified structure element for "news" of FIG. 2, in accordance with an aspect of the present invention;

FIG. 5 shows an embodiment of a website structure creation system, in accordance with an aspect of the present invention; and FIG. 6 shows an embodiment of a computing system comprising the website structure creation system of an aspect of the present invention.

DETAILED DESCRIPTION

In the context of this description, the following conventions, terms and/or expressions may be used:

The term "website structure" may denote a logical structure of a website. A website is known as a set of related web-pages typically served from a single web domain. A website may be hosted on at least one web server, accessible via a network such as the Internet or a private local area network through an Internet address known as a uniform resource locator (URL). In this context, web-pages, which are the building blocks of websites, are electronic documents, typically written in plain text interspersed with formatting instructions of Hypertext Markup Language (e.g., HTML, XHTML). The user's application, often a web browser, renders the page content according to its HTML markup instructions onto a display terminal. The URLs of the pages organize them into a hierarchy; although hyperlinking between them conveys the reader's perceived site structure and guides the reader's navigation of the site which generally includes a home page with most of the links to the site's web content.

It may be noted that there is a difference between creating a web-page and a website structure. Creating a website structure may be done without designing any individual content page. Thus, the creation of a website structure deals with the interdependency of web-pages which may have names but (initially) no content. The focus of the current document is on the creation of the structure of interdependencies of websites and not on the creation and layout of an individual web-page.

The term "site navigation structure sketch" may denote here a free-form sketch done with a pen. It may basically be a drawing using a pen on, e.g., a piece of paper, a whiteboard or the like, or an electronic device with a touch sensitive interface.

The term "free-form drawing using a drawing tool" may denote a generation of a figure, i.e. drawing, using e.g., a pen. The color may be irrelevant. The form of the drawing does not have to be perfectly done using a ruler or the like. However, it may have a series of inconsistencies like no closed boxes or no adjoined lines. It may be as imperfect as a handwritten letter with some additional markings in the form of lines and boxes. However, it may be desirable that the drawing shows a form of a hierarchy. The isolatable and recognizable hierarchical elements may have some more descriptors.

The term "pixel" may—in digital imaging—denote a physical point in a raster image, or the smallest addressable element in an all points addressable display device; so it is the smallest controllable element of a picture represented on the screen or input device. The address of a pixel may correspond to its physical coordinates. A hand drawn sketch may foremost be an image in pixel form, or raster graphics, or a bit map.

The term "vectorizing"—also known as image tracing, raster-to-vector conversion or vectorization—may, in computer graphics, denote the act of a conversion of raster graphics into vector graphics. A plurality of software programs is available for performing the task of vectorization. The end result of many vectorization programs may be curves consisting of cubic Bézier curves. However, in the case of an aspect of the present invention, also simple boxes or lines with linking lines between them may be the result illustrating a hierarchy between a plurality of elements, like web-pages.

The term "site navigation structure" may closely be related to the term "website structure" (see above). However, the more abstract website structure may need a more data driven approach, and thus, a transformation into a practical website navigation structure, which may also be known as a 'web portal site structure' and which may be based on hyperlinks. Here, a web server may offer the site navigation structure to a browser for user navigation through the defined hierarchy of web-pages.

The term "impreciseness" may denote here natural glitches of hand drawn structures. They are not perfect. A line may not be properly connected to another line or may simply overlap the already existing line, although it should only touch it.

It may also be noted that the predefined structured representation may, e.g., be an XML (eXtended Markup Language) representation, an SGML (Standard Generalized Markup Language) or any other representation allowing a structured representation of graphics elements.

One or more aspects of the method for website structure creation, in accordance with an aspect of the present invention, may provide the following:

for instance, a design sketch of a website structure may be transformed from a drawing of a piece of paper or whiteboard or a flipchart into structured information in the form of a website structure reflecting hierarchies and navigation trees between different web-pages of a website. Thus, one or more aspects bridge the gap between sort of unstructured, pixel oriented information—like the design image on the piece of paper—into the structured word of navigation trees of a website. No programming knowledge may be required to generate a website structure within a computer which may be interpreted by a web server and/or a web browser. The unstructured image or sketch may be input to a computer system by means of a touch sensitive screen like, e.g., the ones available on tablet and/or convertible computers. On the other side, the site navigation structure sketch may also be drawn on paper using the pen and may then be scanned into a computer system. Consequently, even designers not used to interacting with a computer system in a more or less complex design language will now be able to design a website structure and make it available in an electronically readable form to a web server. This way, multi-disciplinary teams of programmers, designers, business process engineers and web-page designers—just to name a few categories—may be relieved from using more or less complex electronic tools to "explain" a computer system or input required data for the new creative ideas of website structures.

The usage of white boards or other tools, which are common in brainstorming or design sessions, supports the typical working style of information designers. It is also possible to sketch website structures in times of creative inspiration without the need for the usual IT equipment (e.g., while relaxing or traveling or in a restaurant).

In the following, a detailed description of embodiments in light of the figures will be given. All instructions in the figures are schematic. Firstly, a block diagram of an embodiment of the method for an easy website structure creation is given. Afterwards, further embodiments, as well as embodiments of the website structure creation system for an easy creation of a web site structure, will be described.

FIG. 1 shows a block diagram of an embodiment of the method 100 for an easy website structure creation. Such a website may be a complex web info-site or parts of a web application, just to name two examples of a plurality of options. The method comprises creating, 102, a site navigation structure sketch by means of a free-form drawing, i.e., generating pixel information in the form of an image. For this, a drawing tool may be used which may be executed on a computing device. This computing device may be a mobile computer, e.g., in the form of a tablet computer, a convertible computer or even a smart phone. However, classical PC (personal computer) or other workstations may not be excluded.

Next, the method 100 may comprise storing, 104, the site navigation structure sketch in pixel form, i.e., in computer terms in an unstructured manner. The storing may be performed on a mobile device, or alternatively on a workstation or server in any of the known pixel formats, like PDF (portable document format), TIFF (tagged image file format), JPEG (joint picture exchange experts group interchange format), and so on.

In a next step, the method 100 may comprise processing, 106, the site navigation structure sketch. This may be done by transforming the site navigation structure sketch—the unstructured information—via vectorizing it into a structured predefined representation like, e.g., an XML or SGML representation. This transformation may be done local, e.g., on the mobile device, at a remote server, or via a cloud service offered from a transformation server. A skilled person knows how to transform pixel information into a vectorized graphic image. This vectorized graphic image may then be analyzed—e.g., by means of an analysis engine—in order to create, 108, a site navigation structure based on the structured predefined representation. It may be noted that the site navigation structure may be web server specific. The user may be able to decide and input—via a graphical user interface—for which specific web server infrastructure a concrete site navigation structure may be generated.

Additionally, the method may comprise integrating, 110—also known as publishing—the site navigation structure into an already existing web portal site structure. This may also be an already existing web application, which may be enhanced by the additional website structure serving as a navigation structure for additional web-pages for the portal.

It may be noted that different solutions for converting an image into a vectorized representation exist. E.g., vectormagic.com offers a cloud service that may be used for such a conversion. An HTTP post request or a REST based service request may be used. The service may convert the image from a pixel format into a vectorized format like, e.g., svg (Scalable Vector Graphics, which is an XML-based vector image format for two-dimensional graphics with support for interactivity and animation). The SVG specification is an open standard developed by the World Wide Web Consortium. An alternative approach would be to integrate the conversion service directly into a portal server by e.g., using a library, like AutoTrace, which is open source software and made available by SourceForge.

According to an embodiment of the method, the drawing tool may receive input via a pen input on a sketch board, an electronic white board input, an electronic flipchart, a touchpad input, a mouse input, a trackball input, or a touch sensitive display. These input devices may be connected to a mobile device, like a tablet computer or a convertible computer, a smartphone or phablet computer (i.e., mixture of tablet and smartphone). However, classical PCs and/or workstations or other comparable computing devices are not excluded.

According to another embodiment of the method, the drawing tool may be a scanner adapted for converting a non-digital sketch structure into pixel information. The source of the non-digitized sketch structure could come from, e.g., a piece of paper, a classical, mechanical white board, a flipchart, or a camera image. It may basically come from a surface on which a sketch may be drawn and from which an electronic picture may be taken. Thus, designers of website structures may be freed from using electronic tools.

According to one embodiment of the method, the vectorizing the site navigation structure sketch into the XML representation may be performed by a mobile device, by a transformation server, or a third vectorizing service system, e.g., a cloud service or a cloud transformation server after the site navigation structure sketch has been communicated via a network to such a remote computing system providing the service. Thus, the computing resources may be drawn from sites, from where these vectorization services may be available.

According to one embodiment of the method, the vectorizing the site navigation structure sketch into the XML representation may be performed by saving or exporting the XML representation in a vectorized format by the drawing tool. A skilled person may understand that not every drawing tool may have this vectorization capability. However, if it may already be available as part of the used drawing tool, the feature may be used directly as part of the drawing tool. No data transformation or additional vectorization services may be required.

According to one embodiment of the method, at least one symbol is added to an element, in particular such an element representing website pages. The at least one symbol may be any letter or a plurality of letters, codes, words, or complete text phrases. Such information may, e.g., be used as a title of a web-page linked to a tree of the website structure. The at least one symbol may be entered into the computer by using a keyboard or by a voice recognition system. The transcription may be performed by a server and/or on a mobile computing device, a web server or a transcription service. Known transcription technologies may be used for this. In addition, the input may also be given in the form of the site navigation structure sketch in handwritten form and transformed using OCR technologies (optical pattern recognition). Hence, and according to a further embodiment of the method, the at least one symbol may be recognized as part of the site navigation structure sketch, and the at least one symbol may be related to a closest element of the elements to the symbol. The relationship to the closest element—in particular, a symbol representing a future web-page—may be determined by a predefined threshold value. If the system underlying the method may have two options to build relationships to a closest element, the user may decide by inputting this choice into a graphical user interface indicating different potential relationships between the at least one symbol and a recognized element of a website structure.

According to one embodiment of the method, the site navigation structure sketch may represent a tree structure comprising a plurality of site elements, in particular, website pages. In case a tree structure may not be recognized by the system underlying and executing the method, an error message or a warning may be generated and displayed to the user. The user may then be given the option to enhance the site navigation structure sketch such that the tree-like structure may be recognizable by the system.

According to an embodiment of the method, the processing of the site navigation structure sketch may also comprise removing an impreciseness of the site navigation structure sketch by completing at least one recognized line to fit into the tree-like structure such that each tree element having a tree level is connected to another tree element having a higher tree level with the exception of the highest tree level. Such removing of impreciseness may be controlled by predefined but adjustable threshold values. Known technologies to link an end of a drawn line to a larger structure at certain docket points may be used.

FIG. 2 shows an example site navigation structure sketch 200. This may be created in free-form. Tools for creating such an example site navigation structure sketch 200 have been mentioned above. A trained eye may recognize the tree-like structure. However, the tree-like structure may have its source not on the top of the page but—in this case—on the left side of the page. Any orientation of the tree-like structure as well as elements of the tree-like structure may be allowed. Line 202 may represent the origin or top of the tree-like structure. Naturally, this may be the initial or homepage of a website structure. It may actually have the name "home" attached to it. Different direct navigational options are represented by lines or elements 204, 206, 208 and 210. A substructure is recognizable below element or line 210 in the form of elements 212 and 214. Linked to each line or element there may be a web-page which may be designed using different tools. However, because the intention of the aspects herein is to focus on the website structure and not the design of web-pages, no additional discussion is made here regarding web-page design.

Relatively close to recognizable elements are text blocks. They may represent the at least one symbol, as mentioned above. E.g., the word "shop" may be related to element 204. Because the distance between the word "shop" and the line 204 is the shortest if compared to all other lines. The word "shop" may be related to element 204 and may be used as a headline or name of a related web-page. Similar relationships may be built between element 206 and "news", line 208 and "banking", element 210 and "support", element 212 and "call us", as well as element 214 and "send us an email". All of these phrases may be related to the element as a name of a related web-page. It may be clear that in a real-life application, the lines may not be as straight as shown in FIG. 2.

Also another concept of aspects of the method may be discussed in the context of FIG. 2. E.g., line 206 is not directly linked to any other line of the sketch. However, in a tree-like structure, a stand-alone element like the line 206 does not make any sense. Thus, the discussed removing an impreciseness may determine to link the line 206 to the line 202 because the distance between the line 206 to line 202 is shorter than to any other line in the tree-like structure.

FIG. 3 shows an example 300 of a transformation of the example site navigation structure sketch—using one of the above-mentioned libraries—into an svg file. It may be noted that the svg file also comprises a line for the text block "home"—compare line 3 of FIG. 3. Although this text block "home" is not included in the site navigation structure sketch 200 of FIG. 2, it may be added automatically as a default text block value—or title—for the source or origin 202 of the recognized tree-like structure.

FIG. 4 shows a block diagram 400 of an embodiment of a simplified structure element for "news". As can be seen from the listing, HTML (hypertext markup language) elements are used. Because of the relative length of the XML file, only an example for element 206 "news" is given to demonstrate the transformation of a part of the svg file into an XML structure.

FIG. 5 shows an embodiment of a website structure creation system 500 for an easy creation of a website structure, in accordance with an aspect of the present invention. The system comprises building blocks, like: a creation device 502 adapted for creating a site navigation structure sketch by means of a free-form drawing using a drawing tool interacting with the touch sensitive screen and being executed on a connected computing device, a storage unit 504 adapted for storing the site navigation structure sketch in pixels or pixel information, and a vectorization unit 506 adapted for processing the site navigation structure sketch by transforming the site navigation structure sketch via vectorizing it into a predefined representation, e.g., an XML representation. Furthermore, the system comprises a creation module 508 adapted for creating a site navigation structure based on the XML representation, and an integration module 510 adapted for integrating the site navigation structure into a web portal site structure.

Embodiments of the invention may be implemented together with virtually any type of computer, regardless of the platform being suitable for storing and/or executing program code. FIG. 6 shows, as an example, a computing system 600 suitable for executing program code related to aspects of the present invention.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

Program/utility 614, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the website structure creation system 500 for an easy creation of a website structure may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

As described herein, according to one aspect of the present invention, a method for an easy website structure creation may be provided. The method may comprise creating a site navigation structure sketch by means of a free-form drawing using a drawing tool being executed on a computing device, storing the site navigation structure sketch in pixel form, and processing the site navigation structure sketch by transforming the site navigation structure sketch via vectorizing it into a predefined structured representation. The method may also comprise creating a site navigation structure based on the predefined structured representation, and integrating the site navigation structure into a web portal site structure.

According to another aspect of the present invention, a website structure creation system for an easy creation of a website structure may be provided. The website structure creation system may comprise a creation device adapted for creating a site navigation structure sketch by means of a free-form drawing using a drawing tool interacting with the touch sensitive screen and being executed on a connected computing device, and a storage unit adapted for storing the site navigation structure sketch in pixel format. Furthermore, the website structure creation system may comprise a vectorization unit adapted for processing the site navigation structure sketch by transforming the site navigation structure sketch via vectorizing it into a predefined structured representation; a creation module adapted for creating a site navigation structure based on the predefined structured representation; and an integration module adapted for integrating the site navigation structure into a web portal site structure.

Furthermore, embodiments may take the form of a related computer program product, accessible from a computer-usable or a computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

Aspects of the present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit aspects of the invention. As used herein, the singular forms "a", "an" and "the" are intended to include the plural forms as well, unless the context clearly indicates otherwise. It will further be understood that the terms "comprises" and/or "comprising," when used herein, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below, if any, are intended to include any structure, material, or act for performing the function in combination with other claimed elements, as specifically claimed. The description of aspects of the present invention has been presented for purposes of illustration and description, but is not intended to be exhaustive or limited to the invention in the form disclosed. Many modifications and variations will be apparent to those of ordinary skills in the art without departing from the scope and spirit of aspects of the invention. The embodiments are chosen and described in order to best explain the principles of aspects of the invention and the practical application, and to enable others of ordinary skills in the art to understand the aspects of invention for various embodiments with various modifications, as are suited to the particular use contemplated.

What is claimed is:

1. A computer-implemented method of website structure creation, the computer-implemented method comprising:

storing, by a processing device, a site navigation structure sketch in pixel form, the site navigation structure sketch created by a free-form drawing using a drawing tool being executed on a computing device;

processing, by the processing device, the site navigation structure sketch by transforming the site navigation structure sketch by automatically vectorizing the sketch into a predefined representation;

creating, by the processing device, a site navigation structure based on analyzing the predefined representation, wherein the site navigation structure, when rendered by a web browser, provides a hierarchy of web-pages for user navigation; and integrating, by the processing device, the site navigation structure into a web portal site structure, wherein based on the integrating, the web portal site structure comprises hyperlinks for use in navigating through the hierarchy of web-pages.

2. The computer-implemented method according to claim 1, wherein the drawing tool receives input via a pen input on a sketch board, an electronic white board input, a touchpad input, a mouse input, a trackball input or, a touch sensitive display.

3. The computer-implemented method according to claim 1, wherein the drawing tool is a scanner to convert a non-digitized sketch structure into pixel information.

4. The computer-implemented method according to claim 1, wherein the vectorizing the site navigation structure sketch into the predefined representation is performed by a mobile device, by a transformation server or a third vectorizing service system.

5. The computer-implemented method according to claim 1, wherein the vectorizing the site navigation structure sketch into the predefined representation is performed by saving or exporting the predefined representation in a vectorized format by the drawing tool.

6. The computer-implemented method according to claim 1, wherein at least one symbol is added to an element of the site navigation structure sketch by using a keyboard or voice recognition.

7. The computer-implemented method according claim 6, wherein the at least one symbol is recognized as part of the site navigation structure sketch, and wherein the at least one symbol is related to a closest element to the at least one symbol.

8. The computer-implemented method according to claim 1, wherein the site navigation structure sketch represents a tree structure comprising a plurality of site elements.

9. The computer-implemented method according to claim 1, wherein the processing the site navigation structure sketch further comprises removing an impreciseness of the site navigation structure sketch by completing at least one recognized line to fit into a tree-like structure such that each tree element having a tree level is connected to an another tree element having a higher tree level with an exception of a highest tree level.

10. The computer-implemented method according to claim 1, wherein the predefined representation comprises an Extensible Markup Language representation.

11. A computer system for website structure creation, the computer system comprising:
a memory; and
a processing device in communication with the memory, wherein the computer system is configured to perform a method, said method comprising:
storing, by the processing device, a site navigation structure sketch in pixel form, the site navigation structure sketch created by a free-form drawing using a drawing tool being executed on a computing device;
processing, by the processing device, the site navigation structure sketch by transforming the site navigation structure sketch by automatically vectorizing the sketch into a predefined representation;
creating, by the processing device, a site navigation structure based on analyzing the predefined representation, wherein the site navigation structure, when rendered by a web browser, provides a hierarchy of web-pages for user navigation; and
integrating, by the processing device, the site navigation structure into a web portal site structure, wherein based on the integrating, the web portal site structure comprises hyperlinks for use in navigating through the hierarchy of web-pages.

12. The computer system according to claim 11, wherein the vectorizing the site navigation structure sketch into the predefined representation is performed by saving or exporting the predefined representation in a vectorized format by the drawing tool.

13. The computer system according to claim 11, wherein at least one symbol is added to an element of the site navigation structure sketch by using a keyboard or voice recognition.

14. The computer system according to claim 11, wherein the site navigation structure sketch represents a tree structure comprising a plurality of site elements.

15. The computer system according to claim 11, wherein the processing the site navigation structure sketch further comprises removing an impreciseness of the site navigation structure sketch by completing at least one recognized line to fit into a tree-like structure such that each tree element having a tree level is connected to an another tree element having a higher tree level with an exception of a highest tree level.

16. A computer program product for website structure creation, the computer program product comprising:
a computer readable storage medium readable by a processing circuit and storing instructions for execution by the processing circuit for performing a method comprising:
storing, by the processing circuit, a site navigation structure sketch in pixel form, the site navigation structure sketch created by a free-form drawing using a drawing tool being executed on a computing device;
processing, by the processing circuit, the site navigation structure sketch by transforming the site navigation structure sketch by automatically vectorizing the sketch into a predefined representation;
creating, by the processing circuit, a site navigation structure based on analyzing the predefined representation, wherein the site navigation structure, when rendered by a web browser, provides a hierarchy of web-pages for user navigation; and
integrating, by the processing circuit, the site navigation structure into a web portal site structure, wherein based on the integrating, the web portal site structure comprises hyperlinks for use in navigating through the hierarchy of web-pages.

17. The computer program product according to claim 16, wherein the vectorizing the site navigation structure sketch into the predefined representation is performed by saving or exporting the predefined representation in a vectorized format by the drawing tool.

18. The computer program product according to claim 16, wherein at least one symbol is added to an element of the site navigation structure sketch by using a keyboard or voice recognition.

19. The computer program product according to claim 16, wherein the site navigation structure sketch represents a tree structure comprising a plurality of site elements.

20. The computer program product according to claim 16, wherein the processing the site navigation structure sketch further comprises removing an impreciseness of the site navigation structure sketch by completing at least one recognized line to fit into a tree-like structure such that each tree element having a tree level is connected to an another tree element having a higher tree level with an exception of a highest tree level.

\* \* \* \* \*